United States Patent
Sengupta et al.

(10) Patent No.: US 9,208,923 B2
(45) Date of Patent: Dec. 8, 2015

(54) POWER CABLE COMPRISING INTERPOLYMER COMPOSITIONS AND METHODS FOR MAKING THE SAME

(71) Applicants: Saurav S. Sengupta, Collegeville, PA (US); Michael L. Smith, Lake Jackson, TX (US); John O. Osby, Lake Jackson, TX (US)

(72) Inventors: Saurav S. Sengupta, Collegeville, PA (US); Michael L. Smith, Lake Jackson, TX (US); John O. Osby, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/359,403

(22) PCT Filed: Nov. 21, 2012

(86) PCT No.: PCT/US2012/066191
§ 371 (c)(1),
(2) Date: May 20, 2014

(87) PCT Pub. No.: WO2013/095862
PCT Pub. Date: Jun. 27, 2013

(65) Prior Publication Data
US 2014/0329961 A1    Nov. 6, 2014

Related U.S. Application Data

(60) Provisional application No. 61/578,590, filed on Dec. 21, 2011.

(51) Int. Cl.
*C08F 210/02* (2006.01)
*C08F 222/26* (2006.01)
*H01B 3/44* (2006.01)

(52) U.S. Cl.
CPC .............. *H01B 3/446* (2013.01); *C08F 210/02* (2013.01); *C08F 222/26* (2013.01); *H01B 3/441* (2013.01)

(58) Field of Classification Search
CPC ...... C08F 210/02; C08F 222/26; H01B 3/446; H01B 3/441
USPC ................. 526/322, 324; 524/563; 525/329.5
See application file for complete search history.

(56) References Cited

U.S. PATENT DOCUMENTS

| | | | | |
|---|---|---|---|---|
| 3,404,080 A | * | 10/1968 | Peacock | 174/107 |
| 3,766,149 A | * | 10/1973 | Oiwa et al. | 526/218.1 |
| 2012/0021237 A1 | * | 1/2012 | Confalone et al. | 428/514 |

FOREIGN PATENT DOCUMENTS

| JP | 07292145 A | * | 11/1995 |
|---|---|---|---|
| WO | 93/08222 A1 | | 4/1993 |
| WO | 97/45465 A1 | | 12/1997 |

OTHER PUBLICATIONS

Bremner, Rudin and Haridoss, Polymer Engineering and Science, vol. 32., No. 14, pp. 939-943, Jul. 1992.
Smedberg et al in their article in Polymer, 38, 1997, p. 4127.
Principles of polymerization , G Odian, p. 524-527 ,2004.
Journal of Applied Polymer Science, vol. 26,3537-3541 (1981).
PCT/US2012/066191, International Search Report dated Jun. 27, 2013.
PCT/US2012/066191, International Preliminary Report on Patentability dated Jun. 24, 2014.
PCT/US2012/066191, Written Opinion of the International Searching Authority dated Jun. 21, 2014.

* cited by examiner

*Primary Examiner* — Michael M Bernshteyn

(57) ABSTRACT

Interpolymer resins having ethylene monomer residues and residues of a non-conjugated diene comonomer. The non-conjugated diene comonomer can be a dialkenyl phthalate. Incorporation of non-conjugated diene comonomers into interpolymers can provide additional labile unsaturation sites for cross-linking. The interpolymers and cross-linked variations thereof can be employed in a variety of articles of manufacture, such as, for example, as insulation material for power cables.

17 Claims, No Drawings

POWER CABLE COMPRISING INTERPOLYMER COMPOSITIONS AND METHODS FOR MAKING THE SAME

REFERENCE TO RELATED APPLICATIONS

The present application claims the benefit of U.S. Provisional Application No. 61/578,590, filed on Dec. 21, 2011.

FIELD

Various embodiments of the present invention relate to interpolymer resins. In one aspect the invention relates to cross-linkable interpolymers. Other aspects of the invention concern interpolymers suitable for use as insulation material for wire and cable applications.

INTRODUCTION

In the manufacture of power cables, common polymeric insulators can be made from alpha-olefin type polymers. For instance, an ethylene-based polymer, typically either from polyethylene or ethylene-propylene elastomers, otherwise known as ethylene-propylene-rubber ("EPR"), can be employed in the formation of polymeric insulators. The polyethylene can be any one or more of a number of various polyethylenes, such as homo- or copolymer, high density polyethylene ("HDPE"), high pressure low density polyethylene ("HP LDPE"), and linear low density polyethylene ("LLDPE").

Polyethylenes employed as a component of insulating compositions for power cable applications are typically cross-linked, usually through the action of a peroxide initiator. The efficiency and extent of cross-linking may depend, at least in part, on the amount of labile unsaturation sites (i.e., carbon-carbon double bonds) on the polyethylene. Although improvements have been made in the art of cross-linkable interpolymers, improvements are still desired.

SUMMARY

One embodiment is an interpolymer having polymerized therein: ethylene monomer residues and residues of at least one type of non-conjugated diene comonomer represented by a formula as follows:

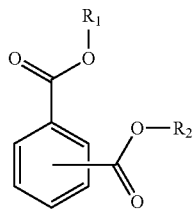

where $R_1$ and $R_2$ are independent $C_2$-$C_{20}$ alkenyl groups.

Another embodiment is an interpolymer having polymerized therein: ethylene monomer residues and residues of at least one type of non-conjugated diene comonomer selected from the group consisting of one or more isomers of diallyl phthalate.

Yet another embodiment is a process for producing an interpolymer, the process comprising: polymerizing in a reaction zone ethylene with at least one type of non-conjugated diene comonomer represented by a formula as follows:

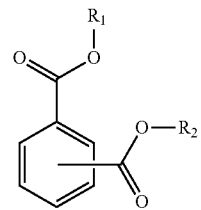

in the presence of a free-radical initiator under conditions sufficient to effect incorporation of at least a portion of the ethylene and at least a portion of the non-conjugated diene comonomer into the interpolymer, where $R_1$ and $R_2$ are independent $C_2$-$C_{20}$ alkenyl groups, each having a terminal carbon-carbon double bond, and where the reaction zone is maintained at a temperature in the range of from 120 to 360° C. during at least 25% of said polymerization.

DETAILED DESCRIPTION

Various embodiments of the present invention concern interpolymers having polymerized therein ethylene monomer residues and residues of at least one comonomer type that is a non-conjugated diene. Such interpolymers can be employed in a variety of commercial applications, including, but not limited to, insulation and jacketing applications for wires and cables. While ethylene-based polymers are primarily discussed herein, it is expected that similar results and products could be achieved based on other alpha-olefin monomer types, either alone or in combination with ethylene.

As just noted, the interpolymers described herein comprise ethylene monomer residues. In addition, the interpolymers can include one or more comonomer residues of an alpha-olefin monomer. Any alpha-olefin known or hereafter discovered in the art may be employed in preparing the interpolymers described herein. In various embodiments, the alpha-olefin comonomer can be any $C_3$-$C_{20}$ alpha-olefin monomer, $C_3$ to $C_{12}$ alpha-olefin monomer, or $C_3$ to $C_5$ alpha-olefin monomer. Specific examples of such alpha-olefin monomers include, but are not limited to, propylene, 1-butene, 1-pentene, 4-methyl-1-pentene, 1-hexene, 1-octene, 1-decene, 1-dodecene, 1-tetradecene, 1-hexadecene, and 1-octadecene. The alpha-olefins can also contain a cyclic structure such as cyclohexane or cyclopentane, resulting in an alpha-olefin such as 3-cyclohexyl-1-propene (allyl cyclohexane) and vinyl cyclohexane. In various embodiments, the alpha-olefin comonomer can be selected from the group consisting of propylene, 1-butene, and mixtures thereof.

In certain embodiments, ethylene monomer constitutes at least 50 weight percent ("wt %") of the entire alpha-olefin content of the interpolymer. In one or more embodiments, ethylene can constitute at least 60 wt %, at least 70 wt %, at least 80 wt %, at least 90 wt %, at least 95 wt %, at least 99 wt %, substantially all, or all of the total alpha-olefin monomer content of the interpolymer.

As noted above, the interpolymer further comprises a non-conjugated diene comonomer. In one or more embodiments, at least a portion of the non-conjugated diene comonomer has the following structure (I):

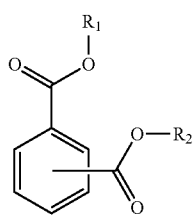

(I)

where $R_1$ and $R_2$ are independent alkenyl groups. As used herein, the term "alkenyl" group denotes a univalent group formed by removing a hydrogen atom from a hydrocarbon and containing at least one carbon-carbon double bond. In various embodiments, the alkenyl groups suitable for use in the non-conjugated diene comonomer represented by structure (I) can independently be $C_2$ to $C_{20}$ alkenyl groups, $C_2$ to $C_{12}$ alkenyl groups, or $C_3$ to $C_6$ alkenyl groups. The alkenyl groups suitable for use can be straight-chain or branched. In various embodiments, each of $R_1$ and $R_2$ are straight-chain alkenyl groups. In one or more embodiments, $R_1$ and $R_2$ can be the same type of alkenyl group. Additionally, in certain embodiments, at least one point of unsaturation can be located on the terminal end of each alkenyl group $R_1$ and $R_2$. In further embodiments, each alkenyl group $R_1$ and $R_2$ can contain a single point of unsaturation, which is located on its terminal end. Illustrative examples of alkenyl groups suitable for use in structure (I) include vinyl groups, allyl groups, 3-butenyl groups, 4-pentenyl groups, 5-hexenyl groups, and 7-octenyl groups. In certain embodiments, $R_1$ and $R_2$ are each allyl groups.

As can be seen by structure (I) above, the non-conjugated diene comonomer can be any of an o-phthalate, isophthalate, terephthalate, or mixtures of two or more thereof. In one or more embodiments, the non-conjugated diene comonomer primarily comprises the o-phthalate isomer on a weight basis. As used herein, the term "primarily" shall denote a concentration of greater than 50%. Additionally, the o-phthalate monomer can constitute at least 60 wt %, at least 70 wt %, at least 80 wt %, at least 90 wt %, at least 95 wt %, at least 99 wt %, substantially all, or all of the non-conjugated diene comonomer, with each weight percent being based on the total non-conjugated diene monomer weight. In various embodiments, the non-conjugated diene comonomer is diallyl-o-phthalate.

In one or more embodiments, residues of the non-conjugated diene comonomer can constitute at least 0.001, at least 0.01, at least 0.02, or at least 0.05 mole percent of the interpolymer. Furthermore, the non-conjugated diene comonomer can constitute in the range of from 0.001 to 5, in the range of from 0.01 to 1, or in the range of from 0.05 to 0.5 mole percent of the interpolymer. Monomer residue content of the interpolymer can be determined by proton nuclear magnetic resonance ("$^1$H NMR") employing a procedure such as described in Example 2, below.

In various embodiments, the ethylene monomer residues constitute all or substantially all of the remainder of the interpolymer. Accordingly, ethylene monomer residues can constitute at least 95, at least 99, or at least 99.5 mole percent of the interpolymer. Furthermore, ethylene monomer residues can constitute in the range of from 95 to 99.999, in the range of from 99 to 99.99, or in the range of from 99.5 to 99.95 mole percent of the interpolymer. Therefore, in various embodiments, the interpolymers can consist of or consist essentially of ethylene monomer residues and residues of the non-conjugated diene comonomer. As will be described in greater detail below, however, the interpolymer can also contain some residual amount of a chain transfer agent, such as, for example, propylene.

In alternate embodiments, the ethylene monomer residues and one or more alpha-olefin comonomer residues can collectively constitute at least 95, at least 99, or at least 99.5 mole percent of the interpolymer. Furthermore, the combined ethylene monomer residues and alpha-olefin comonomer residues can constitute in the range of from 95 to 99.99, in the range of from 99 to 99.98, or in the range of from 99.5 to 99.95 mole percent of the interpolymer. Therefore, in various embodiments, the interpolymers can consist of or consist essentially of ethylene monomer residues, alpha-olefin comonomer residues, and residues of the non-conjugated diene comonomer. Illustrative examples of alpha-olefin comonomers suitable for use in this embodiment include propylene and 1-butene. In various embodiments, the interpolymer comprises both ethylene monomer residues and propylene comonomer residues.

Any methods known or hereafter discovered for preparing an interpolymer can be employed to make an interpolymer having the composition described above. In various embodiments, the interpolymer can be prepared using processes known for making a high pressure low density polyethylene ("HP LDPE"). One conventional high pressure process is described in *Introduction to Polymer Chemistry*, Stille, Wiley and Sons, New York, 1962, pages 149 to 151. High pressure processes are typically free-radical initiated polymerizations conducted in a tubular reactor or a stirred autoclave.

Envisioned processes include a single or multiple autoclaves, a combination of one or more autoclaves and a tubular reactor operated in series and in sequential order, or a single tubular reactor. The processes may be performed using a continuous process. Additionally, it is envisioned that the monomer and comonomer (i.e., non-conjugated diene comonomer and optional other comonomer types) components may be fed into the process entirely in the beginning or at the front or may be parsed and fed into the process at several different locations (for a continuous-type process) during the reaction cycle. Additionally, a chain transfer agent ("CTA") may be included with or added to some or all of the monomer/comonomer additions or streams. This flexibility in addition of monomer/comonomer feed streams as well as the addition of CTAs gives the operator of a process flexibility and utility in creating the disclosed polymer products.

Included in this disclosure is the non-limiting description of a free-radical initiated low density ethylene-based polymerization reaction for a tubular reactor process. Besides feeding the reactor ethylene and, as described above, at least one non-conjugated diene comonomer, as well as other optional comonomers, other components can be fed to the reactor to initiate and support the free-radical reaction as the interpolymer is formed, such as reaction initiators, catalysts, and CTAs.

Methods are known in the art for using a tubular reactor to form low density ethylene-based polymers. The process is a tubular polymerization reaction where a process fluid partially comprised of ethylene is free-radically polymerized creating a highly exothermic reaction. The reaction occurs under high operating pressure in turbulent process fluid flow (hence low density ethylene-based polymers also referred to as "high pressure" polymers). At certain points along the tube, a portion of the heat produced during the free-radical polymerization may be removed through the tube wall. Typical single-pass conversion values for a tubular reactor range from about 20 to 40%. Tubular reactor systems may also include at least one monomer recycle loop to improve conversion efficiency.

When a stirred autoclave reactor is employed, the pressure can be in the range of from 1,000 to 4,000 bar absolute ("bara") (100 to 400 megapascals absolute ("MPaa")), or from 2,000 to 3,000 bara (200 to 300 MPaa), and the temperature can be in the range of 120 to 340 degrees Celsius ("° C."). When a tubular reactor is employed, the pressure can be in the range of 1,000 to 4,000 bara (100 to 400 MPaa) and the temperature can be in the range of 120 to 360° C. Regardless of the method employed, in certain embodiments, the reaction zone during at least a portion of the polymerization can have a temperature of at least 200° C., at least 225° C., or at least 250° C. In such embodiments, the upper limit of the temperature in the reaction zone can be 360° C. Additionally, in various embodiments, the reaction zone can have such temperature for at least 25% of the polymerization, at least 50% of the polymerization, at least 75% of the polymerization, or during the entire polymerization process.

In various embodiments, the interpolymer can be prepared with the use of a free-radical initiator. Any free-radical initiator known or hereafter discovered in the art may be employed by the methods described herein. Suitable free-radical initiators include, but are not limited to, oxygen-based initiators such as organic peroxides ("PO"). Illustrative examples of such initiators include t-butyl peroxy pivalate, di-t-butyl peroxide, t-butyl peroxy acetate, t-butyl peroxy-2-ethylhexanoate, t-butyl peroxy neodecanoate, and mixtures of two or more thereof. These organic peroxy initiators can be used in amounts of between 0.0001 and 0.01 wt % based upon the weight of the high pressure feed. The free-radical polymerization reaction resulting in the disclosed interpolymer occurs in each reaction zone where initiator or catalyst is present. The reaction is an exothermic reaction that generates a large quantity of heat.

As noted above, the interpolymer can be prepared with the use of a CTA. Any CTA known or hereafter discovered in the art may be employed by the methods described herein. Many CTAs are known in the art for use in high-pressure, low density polyethylene production. Example references that include information on the use of CTAs in free-radical polymerization of ethylene and ethylene based polymers include Ehrlich, P., and Mortimer, G. A., "Fundamentals of the Free-Radical Polymerization of Ethylene," *Advanced Polymers*, Vol. 7, 386-448 (1970); Mortimer, George A., "Chain Transfer in Ethylene Polymerization—IV. Additional Study at 1360 Atm and 130° C.," *Journal of Polymer Science*, Part A-1, Vol. 8, 1513-23 (1970); Mortimer, George A., "Chain Transfer in Ethylene Polymerization 5—VI. The Effect of Pressure," *Journal of Polymer Science*, Part A-1, Vol. 8, 1543-48 (1970); Mortimer, George A., "Chain Transfer in Ethylene Polymerization—VII. Very Reactive and Depletable Transfer Agents," *Journal of Polymer Science*, Part A-1, Vol. 10, 163-168 (1972); Great Britain Patent No. 997,408 (Cave); U.S. Pat. No. 3,377,330 (Mortimer); U.S. Patent Publication No. 2004/0054097 (Maehling, et al.); and U.S. Pat. Nos. 6,596,241; 6,673,878; and 6,899,852 (Donck).

After hydrogen atom donation, a CTA may form a radical which can react with a monomer, an oligomer, or a comonomer, and start a new polymer chain. The result is that the original CTA is incorporated into a new or existing polymer chain, thereby introducing a new functionality into the polymer chain associated with the original CTA. The CTA may introduce new functionality into the polymer chain that is not normally the result of the monomer/comonomer polymerization.

In various embodiments, two or more chain transfer agents may be used. Additionally, one or more chain transfer agent may be an alpha-olefin. In other embodiments, a single chain transfer agent may be used. In such embodiments, the single chain transfer agent can be an alpha-olefin. In various embodiments, the chain transfer agent comprises propylene. The chain transfer agent can generally be present during the polymerization in an amount in the range of from 0.05 to 0.5, or from 0.1 to 0.2, wt % based on the combined weight of the ethylene monomer, non-conjugated diene comonomer, and other comonomers, if present.

As is typical of polyolefins, and particularly polyethylene, the resultant interpolymer can have a variety of types of unsaturation, including terminal vinyl groups ($R-CH=CH_2$), vinylidene or pendant vinyl groups ($R-C(=CH_2)-R$), and trans vinylidene ($R-CH_2-CH=CH-CH_2-R$). In the interpolymers of the present disclosure, the above-described non-conjugated diene monomer can also contribute to the unsaturation of the interpolymer. The concentration of unsaturation in polyolefins is conventionally expressed in terms of vinyl or vinylidene groups per 1,000 carbon atoms ("groups/1,000 C"). In various embodiments, the interpolymer can have a vinyl content attributable to the above-described non-conjugated diene comonomer of at least 0.01, at least 0.05, or at least 0.1 vinyl groups/1,000 C. Additionally, the interpolymer can have a vinyl content attributable to the non-conjugated diene comonomer in the range of from 0.01 to 2, in the range of from 0.05 to 1, or in the range of from 0.1 to 0.4 vinyl groups/1,000 C. Also, the interpolymer can have a terminal vinyl content that is not attributable to the comonomer of at least 0.05, at least 0.1 or at least 0.2 vinyl groups/1,000 C. Furthermore, the interpolymer can have a terminal vinyl content that is not attributable to the comonomer in the range of from 0.05 to 2, in the range of from 0.1 to 1, or in the range of from 0.2 to 0.5 vinyl groups/1,000 C. The vinyl content of the interpolymer can be determined by proton nuclear magnetic resonance ("$^1$H NMR") under conditions provided for in Example 2, below.

The interpolymer can have a melt index in the range of from 1 to 50 dg/min., or in the range of from 1 to 3 dg/min., as determined according to ASTM D-1238 (190° C./2.16 kg). Furthermore, the interpolymer can have a density in the range of from 0.90 to 0.94 g/cm$^3$, or in the range of from 0.91 to 0.93 g/cm$^3$, as determined according to ASTM D-792. Also, the interpolymer can have a polydispersity index (i.e., weight average molecular weight/number average molecular weight; "Mw/Mn"; or molecular weight distribution ("MWD")) in the range of from 2 to 30, or in the range of from 3 to 10, as determined by gel permeation chromatography.

The interpolymer as described above can have various uses, and may be employed in the preparation of articles of manufactures. In certain embodiments, the interpolymer can be employed in the preparation of wires and cables, particularly as an insulation material surrounding or at least partially surrounding a conductor. Generally speaking, when used as an insulation material with a cable (e.g., a power cable), the interpolymer will undergo cross-linking, thereby forming an at least partially cross-linked interpolymer. Such cross-linking can be performed by any known or hereafter discovered methods for cross-linking a polyolefin containing sites of unsaturation.

In various embodiments, the cross-linking of the interpolymer can be performed with the use of an initiator, such as a peroxide initiator. Examples of peroxide initiators include, but are not limited to, dicumyl peroxide; bis(alpha-t-butyl-peroxyisopropyl)benzene; isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)3,3,5-trimethylcyclohexane; isopropylcumyl cumylperoxide; di(isopropylcumyl) peroxide; and mixtures of two or more thereof. Peroxide initiators are typically used in amounts of 0.1 to 3, more typically 0.5 to 3, and even more typically 1 to 2.5 wt % based on the total composition weight. Various curing coagents (as well as boosters or retarders) can also be used in combination with the peroxide initiator, and these include triallyl isocyanurate; ethoxylated bisphenol A dimethacrylate; alpha-methyl styrene dimer; and the other co-agents described in U.S. Pat. Nos. 5,346,961 and 4,018,852. Coagents are used, if used at all, typically in amounts of greater than 0 (e.g., 0.01) to 3, more typically 0.1 to 0.5 and even more typically 0.2 to 0.4 wt % based on the total composition weight.

Additionally, an antioxidant can be employed during preparation. Exemplary antioxidants include hindered phenols such as tetrakis [methylene (3,5-di-t-butyl-4-hydroxyhydrocinnamate)]methane, bis[(beta-(3,5-di-t-butyl-4-hydroxybenzyl)-methylcarboxyethyl)]sulphide, 4,4'-thiobis(2-t-butyl-5-methylphenol), 2,2'-thiobis(4-methyl-6-t-butylphenol), and thiodiethylene bis(3,5-di-t-butyl-4-hydroxy hydrocinnamate); phosphites and phosphonites such as tris(2,4-di-t-butylphenyl)phosphite and di-t-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline, 4,4'-bis(alpha, alphadimethylbenzyl)diphenylamine, and alkylated diphenylamines. Antioxidants can be used in amounts of 0.1 to 5 wt % based on the total composition weight. In the formation of wire and cable compositions, antioxidants are typically added to the system before processing (i.e., prior to extrusion and cross-linking) of the finished article. For liquid antioxidants the pellets can be sprayed with the materials. For solid antioxidants, they can be melt-mixed with the resin.

The resultant cross-linked interpolymer can have a hot-creep of 50 percent or less, 45 percent or less, 40 percent or less, 35 percent or less, 30 percent or less, 25 percent or less, or 20 percent or less. Hot-creep is determined by standard method ICEA T-28-562 at 150° C. Additionally, the cross-linked interpolymer can have an initial dielectric breakdown (a.k.a., alternating current breakdown "ACBD"), as determined by ASTM D149, of at least 30 or at least 35 kV/mm. Furthermore, the cross-linked interpolymer can have a wet-aged ACBD, as determined by the methods provided in the following examples and ASTM D149, of at least 20 or at least 25 kV/mm. Also, the cross-linked interpolymer can have a retained ACBD in the wet-aged ACBD compared to the initial ACBD of at least 50, at least 55, at least 60, at least 65, or at least 70 percent.

When employed in articles of manufacture, the cross-linked interpolymer may contain other additives including, but not limited, to processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Additives, other than fillers, are typically used in amounts ranging from 0.01 or less to 10 or more wt % based on total composition weight. Fillers are generally added in larger amounts although the amount can range from as low as 0.01 or less to 50 or more wt % based on the weight of the composition. Illustrative examples of fillers include clays, precipitated silica and silicates, fumed silica, calcium carbonate, ground minerals, and carbon blacks with typical arithmetic mean particle sizes larger than 15 nanometers.

Compounding of a cable insulation material can be effected by standard equipment known to those skilled in the art. Examples of compounding equipment are internal batch mixers, such as a Banbury™ or Bolling™ internal mixer. Alternatively, continuous single, or twin screw, mixers can be used, such as a Farrel™ continuous mixer, a Werner and Pfleiderer™ twin screw mixer, or a Buss™ kneading continuous extruder.

A cable containing an insulation layer comprising an interpolymer can be prepared with various types of extruders (e.g., single or twin screw types). A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If the extruder has more than one barrel, the barrels are connected in series. The length to diameter ratio of each barrel is in the range of about 15:1 to about 30:1. In wire coating where the polymeric insulation is cross-linked after extrusion, the cable often passes immediately into a heated cure zone downstream of the extrusion die. The heated cure zone can be maintained at a temperature in the range of 200 to 350° C., or in the range of 170 to 250° C. The heated zone can be heated by pressurized steam or inductively heated pressurized nitrogen gas. The cable is then cooled upon exiting the cure zone.

Some embodiments of the invention are illustrated by the following examples.

Test Methods

Density

Density is determined according to ASTM D 1928. Samples are pressed at 374° F. (190° C.) and 30,000 psi for three minutes, and then at 70° F. (21° C.) and 30,000 psi for one minute. Density measurements are made within one hour of sample pressing, using ASTM D792, Method B.

Melt Index

Melt index, or $I_2$, is measured in accordance by ASTM D 1238, Condition 190° C./2.16 kg, and is reported in grams eluted per 10 minutes. The I10 is measured in accordance with ASTM D 1238, Condition 190° C./10 kg, and is reported in grams eluted per 10 minutes.

Molecular Weight Distribution

The gel permeation chromatography ("GPC") system consists of a Polymer Char GPC-IR High Temperature Chromatograph, equipped with an IR4 infra-red detector from Polymer ChAR (Valencia, Spain). Data collection and processing is performed using Polymer Char software. The system is also equipped with an on-line solvent degassing device.

Suitable high temperature GPC columns can be used, such as four 30 cm long Shodex HT803 13 micron columns, or four 30 cm Polymer Labs columns of 13-micron mixed-pore-size packing (Olexis LS, Polymer Labs). Here, the Olexis LS columns were used. The sample carousel compartment is operated at 140° C., and the column compartment is operated at 150° C. The samples are prepared at a concentration of 0.1 grams of polymer in 50 milliliters of solvent. The chromatographic solvent and the sample preparation solvent is 1,2,4- trichlorobenzene ("TCB") containing 200 ppm of 2,6-di-tert-butyl-4-methylphenol ("BHT"). The solvent is sparged with nitrogen. The polymer samples are stirred at 160° C. for four hours. The injection volume is 200 microliters. The flow rate through the GPC is set at 1 mL/minute.

The GPC column set is calibrated by running 21 narrow molecular weight distribution polystyrene standards. The molecular weight ("MW") of the standards ranges from 580 g/mol to 8,400,000 g/mol, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to, or greater than, 1,000,000 g/mol, and at 0.05 g in 50 mL of solvent for molecular weights less than 1,000,000 g/mol. The polystyrene standards are dissolved at 80° C., with agitation, for 30 minutes. The narrow standards mixtures are run first, and in order of decreasing highest molecular weight component to minimize degradation. The polystyrene standard peak molecular weights are converted to polyethylene molecular weight using Equation (1) (as described in Williams and Ward, J. Polym. Sci., Polym. Letters, 6, 621 (1968)):

$$M\text{polyethylene} = A \times (M\text{polystyrene})^B \quad \text{(Eq. 1)}$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as discussed below. Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{cc} = \sum_i \left(\frac{C_i}{\sum_i C_i}\right) M_i = \sum_i w_i M_{cc,i} \quad \text{(Eq. 2)}$$

$$M_{n,cc} = \sum w_i / \sum (w_i / M_{cc,i}) \quad \text{(Eq. 3)}$$

$$M_{z,cc} = \sum (w_i M_{cc,i}^2) / \sum (w_i M_{cc,i}) \quad \text{(Eq. 4)}$$

EXAMPLES

Example 1

Resin Preparation

Prepare three polyethylene-based polymer resin samples using a 0.3 liter ("L") single-zone autoclave, continuous reactor ("Reactor"). Prepare Comparative Sample 1 using only ethylene monomer (CAS#74-85-1; available from The Dow Chemical Company) with propylene (CAS#115-07-1; available from The Dow Chemical Company) as a chain transfer agent ("CTA"). Prepare Inventive Samples 2 and 3 using ethylene monomer, propylene as a CTA, and diallyl-o-phthalate ("DAP") (CAS#131-17-9; available from Sigma Aldrich).

Feed ethylene feed to the Reactor at 12 lb/hr. (5.44 kg/hr.) and maintain Reactor temperature at 245 to 255° C. by way of peroxide mixture and heater blankets. The peroxide mixture consists of di-t-butyl peroxide (CAS#110-05-4; available from Akzo Nobel) and t-butyl-peroxyacetate (CAS#107-71-1; available from Akzo Nobel) at concentrations of 1 wt % and 0.3 wt % respectively in ISOPAR™-E (CAS#64741-66-8; ExxonMobil Chemical). Adjust heater blanket temperature and peroxide mixture feed to maintain both desired reactor temperature and ethylene conversion. Maintain ethylene conversion at 10 percent, calculated by comparing weighed samples and inlet ethylene feed.

Feed the CTA to the reactor at a rate sufficient to control the melt index near 2 dg/min. For inventive samples 2 and 3, DAP is mixed in ethyl acetate (CAS#141-78-6; available from Sigma Aldrich) at a concentration of 10 wt % prior to being fed into the reactor. The DAP is fed at a rate sufficient to reach a desired molar ppm in the feed for each sample, as shown in Table 1, below. For Comparative Sample 1, feed ISOPAR™-E at a rate of 35 g/hr. in place of the DAP solution.

Maintain Reactor pressure at 2,000 bar gauge (200,000 kPa) for all experiments by a letdown valve. Product leaving the reactor is let down to ambient pressure. Vent gases while product is purged to remove volatiles inside a low pressure separator. Remove product, weigh for conversion calculation, and analyze. The product characteristics of the resins are given in Table 1, below, where the melt index ("MI") is measured per standard procedure ASTM 1238. As noted above, comparative Sample 1 is made without utilizing DAP, while samples 2 and 3 are made using DAP.

TABLE 1

LDPE resins made in a high pressure reactor

| Sample | Melt Index (dg/min) | DAP Feed Concentration (molar ppm) |
|---|---|---|
| Comparative Sample 1 | 2.0 | 0 |
| Inventive Sample 2 | 2.8 | 120 |
| Inventive Sample 3 | 1.9 | 340 |

Example 2

Unsaturation Measurement

Three kinds of unsaturation are noted in LDPE:
Terminal Vinyl: R—CH=CH$_2$
Vinylidene (or Pendant Vinyl ("PV")): R—C(=CH$_2$)—R
Trans vinylidene: R—CH$_2$—CH=CH—CH$_2$—R
Prepare samples for $^1$H NMR analysis by adding ~130 mg of sample as prepared in Example 1 to 3.25 g of 50/50 by weight tetrachloroethane-d$_2$ with 0.001M chromium (III) acetylacetonate ("Cr(AcAc)3") in a NORELL 1001-7 10-mm NMR tube. Purge the samples by bubbling nitrogen through the solvent via a pipette inserted into the tube for approximately 5 minutes to prevent oxidation, cap, seal with Teflon tape, and then soak at room temperature overnight to facilitate sample dissolution. Keep samples in a nitrogen purge box during storage before and after preparation to minimize exposure to oxygen. Heat samples at 115° C. and mix them with a vortex mixer to ensure homogeneity.

$^1$H NMR is performed on a Bruker AVANCE 400 MHz spectrometer equipped with a Bruker Dual DUL high-temperature CryoProbe and a sample temperature of 120° C. The spectra are acquired with ZG pulse, 16 scans, SWH 10,000 Hz, AQ 1.64s, D$_1$ 14s.

Calculate the vinyl content per 1,000 carbons from the data. The total amount of DAP in the samples includes singly-bound (one DAP vinyl group reacted to polymer), doubly bound (both DAP vinyl groups reacted to polymer) and free or unbound (no DAP vinyl groups reacted to polymer) DAP molecules. Analysis to determine the amount of singly- and doubly-bound DAP is performed by washing the sample with ethyl acetate. Washing the sample involves mixing 0.05 grams of the sample with 10 grams of ethyl acetate and shaking at room temperature for 24 hours. The solvent is periodically checked for DAP concentration to ensure it is not increasing. This indicates that the free or unbound DAP is dissolved in the ethyl acetate.

Free or unbound DAP is measured in the ethyl acetate solution by a calibrated gas chromatograph. The DAP measured in the ethyl acetate is assumed to be 100% of free or unbound DAP previously dissolved in the polymer sample. Under assumption, knowing the concentration of DAP in ethyl acetate, and knowing the initial masses of polymer and ethyl acetate, the concentration of free or unbound DAP in the polymer sample is calculated.

The concentration of DAP in ethyl acetate, the total amount of DAP detected by NMR, and the total amount of DAP vinyl detected by NMR are used to perform a material balance. The material balance is shown below:

DAPv=Total number of DAP vinyls per 1000 carbons measured by NMR
DAP=Total number of DAP molecules per 1000 carbons measured by NMR
DAP0=Total number of DAP molecules unreacted per 1000 carbons
DAPw=Weight fraction of unreacted DAP molecules measured by washing
DAP1=Total number of DAP molecules reacted on 1 side per 1000 carbons
DAP2=Total number of DAP molecules reacted on 2 sides per 1000 carbons $$(1) DAP = DAP0 + DAP1 + DAP2$$

$$(2) DAPv = 2*DAP0 + DAP1$$

$$(1)-(2) \xrightarrow{yields} (3) DAP2 = DAP - DAPv + DAP0$$

$$(3) \text{into} (1) \xrightarrow{yields} (4) DAP1 = DAPv - 2*DAP0$$

$$\frac{(4)}{(3)} \xrightarrow{yields} (5) \frac{DAP1}{DAP2} = \frac{DAPv - 2*DAP0}{DAP - DAPv + DAP0}$$

The ratio in equation (5) is found to be 6.2. It is understood that the value of the ratio could change based on reactor operation and that it is an estimate only. However, the above analysis provides means by which to determine the concentrations of singly- and doubly-bound DAP when free DAP is present and NMR is used to determine the total amount of DAP and the total amount of vinyl DAP present in the sample.

Estimating the value of the molar ratio of singly-bound to doubly-bound DAP allows calculations of free, singly-, and doubly-bound DAP in the polymer without the "washing" step. Returning to equation (1) and (2) above, use the molar ratio to solve for singly- and doubly-bound DAP. Below is the equation for determining singly-bound DAP concentration.

$$(1) DAP = DAP0 + DAP1 + DAP2$$

$$(2) DAPv = 2*DAP0 + DAP1$$

$$(8) DAP1 = 6.2*DAP2$$

$$(9) DAP1 = \frac{6.2}{8.2} *(2*DAP - DAPv)$$

The measured and calculated values for the above-described samples are provided in Table 2, below.

TABLE 2

Unsaturation data for LDPE resins

| Sample | LDPE Vinyl groups/ 1000 C. | LDPE Vinylidene groups/ 1000 C. | Total DAP vinyl groups/ 1000 C. (DAPv) | Total number of DAP molecules/ 1000 C. (DAP) | Singly-bound DAP vinyl groups/1000 C. (DAP1) |
|---|---|---|---|---|---|
| Comparative sample 1 | 0.19 | 0.17 | 0 | 0 | 0 |
| Inventive sample 2 | 0.22 | 0.15 | 0.44 | 0.29 | 0.10 |
| Inventive sample 3 | 0.20 | 0.15 | 1.53 | 1.04 | 0.41 |

Example 3

Cross-Linking and Performance Characterizations

In order to cross-link the resin samples prepared as described above, dicumyl peroxide (PERKADOX® BC-FF; available from AkzoNobel) is imbibed into pellets of the sample resins and cure assessments are performed on the cross-linked materials. The dicumyl peroxide is first melted. Pre-heat the resin samples, in the form of pellets, in a large glass jar at 70° C. for 4 hours; thereafter, add the dicumyl peroxide melt using a syringe at a concentration of about 1.9 wt % based on the combined weight of the dicumyl peroxide and resin sample. Cap the jar of pellets tightly and place on a stoneware tumbler set at 30 rotations per minute ("rpm"). After two minutes of tumbling, remove the jar and manually shake to loosen the pellets from the side of the jar. Place the jar back on the tumbler for one minute, then remove and place back in the 70° C. oven until all the peroxide is visually absorbed (i.e., the pellets did not look wet or have a white residue) (approximately 6 hours).

Compression mold samples of the peroxide-treated resins using a steam press (WABASH, model no. G302H-12-CLX) operated in the manual mode. Prepare plaques (8×8 inch) for each sample per requirement of the tests to be carried out on samples. Pre-heat the press to 115° C. (±5° C.). Pre-weigh a total of 75 grams of material and place in the center of a 75 mil stainless steel plaque between the mold assembly made up of mylar and aluminum sheets. Then place the filled mold into the press at 300 psi for three minutes. After three minutes, rapidly increase the temperature to 185° C. (±5° C.) and the pressure to 2,500 psi gauge ("psig"). Cross-link the plaques at 185° C. and 2,500 psig for 15 minutes.

Analyze each of the cross-linked samples for extent of cross-linking and dielectric breakdown (a.k.a., AC breakdown) ("ACBD"). Hot-creep experiments, which are performed at 150° C., measure the extent of cross-linking of these samples. Hot-creep determinations are made following standard method ICEA T-28-562. For hot-creep analyses, lower hot-creep percentages indicate greater degree of cross-linking.

Test each of the cross-linked samples as described above for ACBD according to ASTM D149. Thereafter, wet age each sample by clamping a cross-linked material slab of 1-mm thickness between halves of a "U"-shaped tube, where each half of the tube is filled with an electrolyte solution (0.01M NaCl solution). Apply a 6 kV 1 kHz voltage across the sample using wire electrodes in the electrolyte solution. After 15 days of aging in the U-shaped tube, wipe the sample dry and subject to 60 Hz ACBD testing per ASTM D149, using a 0.5 kV/s voltage ramp.

The results from the hot-creep analyses, initial ACBD, and wet aged ACBD are provided in Table 3, below:

TABLE 3

Performance properties of cross-linked LDPE resins

| Sample | Hot-creep (%) | Initial ACBD (kV/mm) | Wet aged ACBD (kV/mm) | Retained ACBD (%) |
| --- | --- | --- | --- | --- |
| Comparative Sample 1 | 62 | 36.5 | 17.1 | 47% |
| Inventive Sample 2 | 40 | 37 | 22 | 59% |
| Inventive Sample 3 | 20 | 35.8 | 25.4 | 71% |

It is clear from Table 3 that samples containing DAP far outperformed the samples not containing DAP, as is seen from the much lower hot-creep and much improved retained ACBD values.

DEFINITIONS

"Wire" and like terms mean a single strand of conductive metal, e.g., copper or aluminum, or a single strand of optical fiber.

"Cable," "power cable," and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783, 6,496,629 and 6,714,707.

"Polymer" and like terms mean a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers (three different monomers), tetrapolymers (four different monomers), etc.

"Residue," when referring to a monomer, means that portion of a monomer molecule which resides in a polymer molecule as a result of being polymerized with another monomer or comonomer molecule to make the polymer molecule.

Numerical Ranges

Numerical ranges include all values from and including the lower and the upper values, in increments of one unit, provided that there is a separation of at least two units between any lower value and any higher value. As an example, if a compositional, physical or other property, such as, for example, molecular weight, wt % ages, is from 100 to 1,000, then the intent is that all individual values, such as 100, 101, 102, and sub ranges, such as 100 to 144, 155 to 170, 197 to 200, are expressly enumerated.

The invention claimed is:

1. A power cable comprising:

a conductor; and an insulation material, wherein said insulation material comprises an interpolymer having polymerized therein:

ethylene monomer residues; and residues of at least one type of non-conjugated diene comonomer represented by a formula as follows:

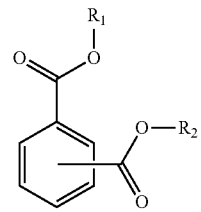

wherein $R_1$ and $R_2$ are independent $C_2$-$C_{12}$ alkenyl groups, wherein said interpolymer is cross-linked.

2. The power cable of claim 1, wherein said non-conjugated diene comonomer is selected from the group consisting of one or more isomers of diallyl phthalate.

3. The power cable of claim 1, wherein said non-conjugated diene comonomer is diallyl-o-phthalate.

4. The power cable of claim 1, wherein said interpolymer has a vinyl content attributable to said non-conjugated diene comonomer residues of at least 0.01 per 1,000 carbon atoms.

5. The power cable of claim 1, wherein said ethylene monomer residues constitute in the range of from 95 to 99.99 mole percent of said interpolymer, wherein said residues of said non-conjugated diene comonomer constitute in the range of from 0.001 to 5 mole percent of said interpolymer.

6. The power cable of claim 1, wherein said cross-linked interpolymer has a hot-creep of 50 percent or less.

7. A process for producing an interpolymer, said process comprising: polymerizing in a reaction zone ethylene with at least one type of non-conjugated diene comonomer represented by a formula as follows:

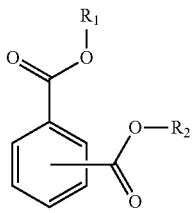

in the presence of a free-radical initiator under conditions sufficient to effect incorporation of at least a portion of said ethylene and at least a portion of said non-conjugated diene comonomer into said interpolymer, wherein $R_1$ and $R_2$ are independent $C_2$-$C_{12}$ alkenyl groups, each having a terminal carbon-carbon double bond, wherein said reaction zone is maintained at a temperature in the range of 120 to 360° C. during at least 25 percent of said polymerization, wherein said residues of said non-conjugated diene comonomer constitute in the range of from 0.001 to 1 mole percent of said interpolymer, wherein said ethylene monomer residues constitute the remainder of said interpolymer.

8. The process of claim 7, further comprising cross-linking at least a portion of said interpolymer.

9. The process of claim 7, wherein said interpolymer has a vinyl content attributable to residues of said non-conjugated diene comonomer of at least 0.01 per 1,000 carbon atoms, wherein said non-conjugated diene comonomer is diallyl-o-phthalate, wherein said polymerization is performed in the presence of a chain transfer agent comprising propylene.

10. An interpolymer having polymerized therein:
ethylene monomer residues; and
residues of at least one type of non-conjugated diene comonomer represented by a formula as follows:

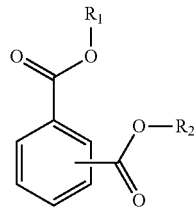

wherein $R_1$ and $R_2$ are independent $C_2$-$C_{12}$ alkenyl groups,
wherein said residues of said non-conjugated diene comonomer constitute in the range of from 0.001 to 1 mole percent of said interpolymer,
wherein said residues of said ethylene monomer constitute the remainder of said interpolymer.

11. The interpolymer of claim 10, wherein said residues of said non-conjugated diene comonomer constitute in the range of from 0.01 to 1 mole percent of said interpolymer.

12. The interpolymer of claim 10, wherein said non-conjugated diene comonomer is selected from the group consisting of one or more isomers of diallyl phthalate.

13. The interpolymer of claim 10, wherein said non-conjugated diene comonomer is diallyl-o-phthalate.

14. The interpolymer of claim 10, wherein said interpolymer has a vinyl content attributable to said non-conjugated diene comonomer residues of at least 0.01 per 1,000 carbon atoms.

15. The interpolymer of claim 10, wherein said interpolymer is cross-linked, wherein said cross-linked interpolymer has a hot creep of 50 percent or less.

16. The power cable of claim 1, wherein said residues of said non-conjugated diene comonomer constitute in the range of from 0.001 to 1 mole percent of said interpolymer.

17. The power cable of claim 1, wherein said residues of said non-conjugated diene comonomer constitute in the range of from 0.01 to 1 mole percent of said interpolymer.

* * * * *